No. 633,026. Patented Sept. 12, 1899.
T. W. MORRIS.
VEHICLE WHEEL TIRE.
(Application filed Nov. 7, 1898.)
(No Model.)
FIG. 1.
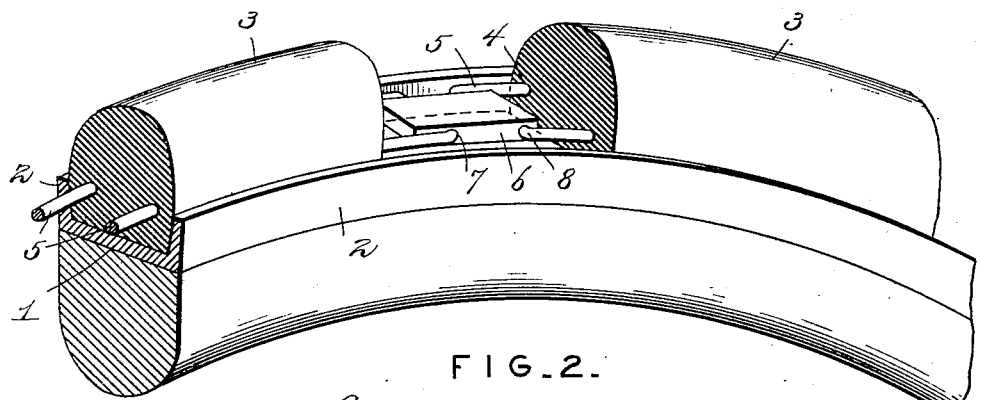
FIG. 2.
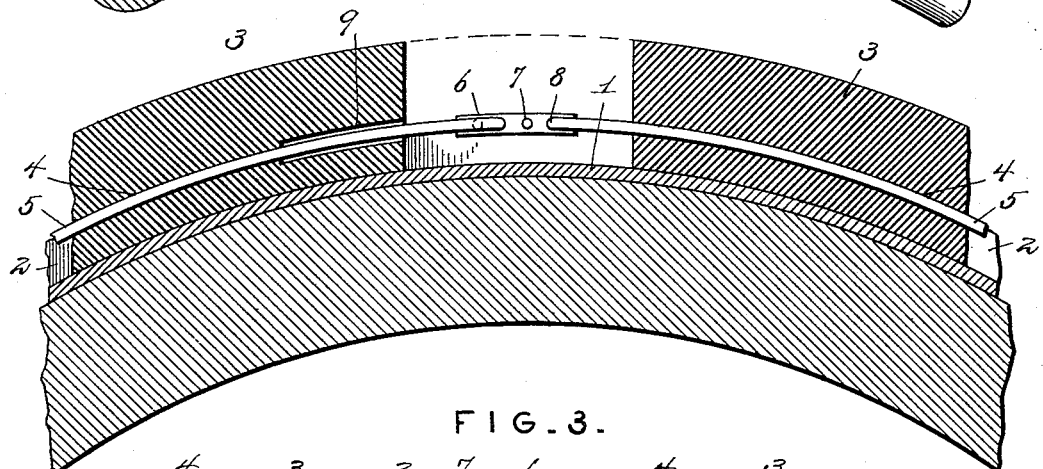
FIG. 3.
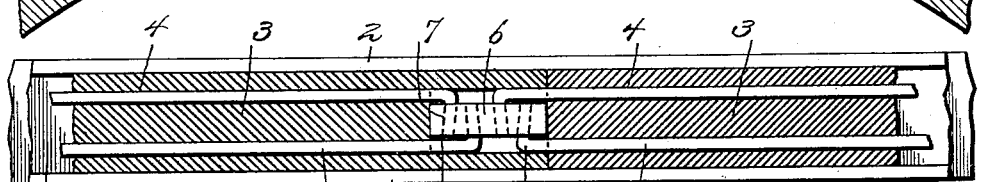
FIG. 4.       FIG. 6.       FIG. 5.
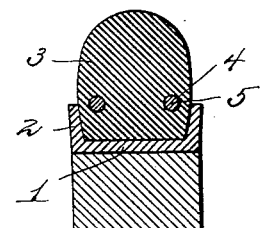 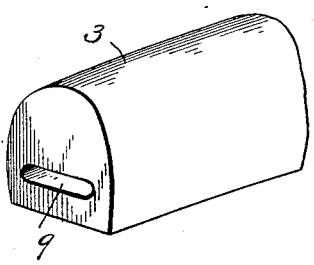 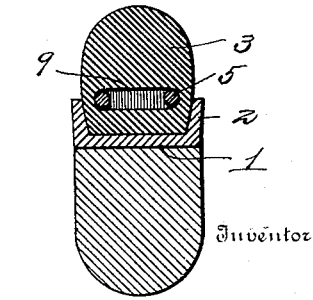
Witnesses
Harry L. Amel
K. A. Kau
Inventor
Thomas W. Morris.
by V. S. Stockbridge
his Attorney.

UNITED STATES PATENT OFFICE.

THOMAS W. MORRIS, OF CHICAGO, ILLINOIS.

VEHICLE-WHEEL TIRE.

SPECIFICATION forming part of Letters Patent No. 633,026, dated September 12, 1899.

Application filed November 7, 1898. Serial No. 695,737. (No model.)

*To all whom it may concern:*

Be it known that I, THOMAS W. MORRIS, a citizen of the United States, residing at Chicago, in the county of Cook and State of Illinois, have invented certain new and useful Improvements in Vehicle-Wheel Tires; and I do hereby declare the following to be a full, clear, and exact description of the invention, such as will enable others skilled in the art to which it appertains to make and use the same.

This invention relates to vehicle-wheel tires; and the object of the invention is to provide efficient means whereby the contiguous ends of the binding or securing wires of a tire may be conveniently joined without the assistance of an expert mechanic.

In tires employing binding or securing wires or strips passing longitudinally through them it has heretofore been the practice to connect the wires by twisting the overlapping ends thereof upon each other or by welding the ends together. This operation has necessarily been performed in a workshop where the proper tools were accessible and could not be performed except in such way.

The object of this invention is to provide a coupling-block by means of which the contiguous ends of the binding wires or wire of the tire may be connected, thereby securing the tire as a whole in the rim.

The detailed objects and advantages of the invention will appear in the course of the subjoined description.

The invention consists in certain novel features and details of construction and arrangement of parts, as hereinafter fully described, illustrated in the drawings, and incorporated in the claims.

In the accompanying drawings, Figure 1 is a perspective view showing a section of a wheel-rim and sections of the tire forming the contiguous ends of the tire and the improved means for coupling or securing together the ends of the binding or securing wires. Fig. 2 is a vertical longitudinal section through the same. Fig. 3 is a longitudinal section taken at right angles to Fig. 2 and in a line with the securing-wires. Fig. 4 is a cross-section through the tire, rim, and binding-wires, taken adjacent to one terminal of the tire. Fig. 5 is a similar view taken at the other terminal of the tire. Fig. 6 is a detail perspective view of one extremity of the tire, showing the recess for the reception of the coupling-block.

Similar numerals of reference designate corresponding parts in all the views.

Referring to the drawings, 1 designates a rim provided with side flanges 2, and 3 represents the tire fitting upon the rim and between the flanges, said parts being of the ordinary construction employed upon vehicle-wheels. The tire 3 is provided in its base portion with parallel openings 4, extending longitudinally therethrough from end to end, in which openings are placed the binding or securing strips or wires 5.

In carrying out the present invention I employ a coupling-block 6, which is of oblong form, the length thereof being sufficient to allow of the formation of four separate and independent transverse openings or sockets 7 therein, said openings or sockets extending in a plane parallel to the base of the rim. By reference to Fig. 3 it will be seen that the openings or sockets 7 do not extend exactly across the coupling-block, but are oblique, two of the sockets inclining in one direction and two in the reverse direction, the two end sockets being substantially parallel and the two intermediate sockets being parallel to each other.

One of the wires 7 has its extremity bent at an acute angle by means of a suitable hand implement provided especially for that purpose, and such bent end (indicated at 8) is inserted in one of the outer sockets, as shown. The other wire has its ends similarly bent at an acute angle and inserted in the next adjoining intermediate socket. The two wires or strips at the other end of the tire have their ends similarly bent and inserted in the corresponding sockets or openings in the opposite end of the coupling-block. When so inserted, the greater the strain that is put upon the securing-wires the firmer said wires will be held in place on account of the inclination of their ends, the tendency being to cause said ends to crowd more firmly into the sockets in the coupling-block provided therefor.

One end of the tire is provided with an enlarged recess or socket 9, designed to receive and entirely conceal and cover the coupling-block 6. The said recess 9 extends across from one wire-opening to the other and extends from the extremity of the tire inward sufficiently to entirely receive and inclose the coupling-block. Both of the wire-openings in the tire communicate with the block-receiving recess at opposite sides of the latter, and when the coupling-block, containing the bent ends of the strips, is slid into said recess the sides of the recess lock the ends of the strips in the coupling-block, making it impossible for them to escape.

The operation of placing the tire upon the rim may be described as follows: The tire is compressed or pushed backward upon the securing-wires, so as to expose a portion of said wires, and thereupon the extremities of the wires are bent and inserted in one end of the coupling-block. The proper length of tire is now measured off, eight or ten inches lap being allowed, or more, according to the size of the wheel. By placing the ends of the wire in a vise the tire is now compressed or crowded back upon the wires a distance equal to the lap allowed and several inches beyond, and the wires at both ends of the tire are secured upon the rim by suitable clamps provided for that purpose. The inbent ends of the wire are now cut off the proper lengths, and by means of the hand implement above referred to the extremities thereof are bent at acute angles and inserted in their respective openings or sockets in the other end of the coupling-block, the wires having been previously stretched. The clamps are now removed and the ends of the tire crowded together in any preferred manner, whereupon the application of the tire to the rim is complete.

Having thus described the invention, what is claimed as new, and desired to be secured by Letters Patent, is—

1. A resilient tire, solid in cross-section with the exception of parallel openings extending therethrough for the reception of a pair of securing-strips, said tire having formed in one end thereof a block-receiving recess closed on all sides except at the extremity of the tire and extending across and communicating with both of said parallel openings and designed to slidingly receive and entirely inclose a coupling-block, by means of which the ends of the securing-strips are coupled together and allowed to be slid backward off the block, substantially as described.

2. A resilient tire solid in cross-section with the exception of parallel openings extending longitudinally therethrough for the reception of a pair of securing-strips, said tire being provided in one end with a recess closed on all sides except at the extremity of the tire and extending across between and communicating with both of said parallel openings, a coupling-block adapted to slide longitudinally into and out of said recess, and a pair of securing-strips passing through the openings in the tire and having their ends bent and free to be inserted in and removed from openings in said coupling-block, when the latter is slid out of the recess and adapted to be retained in the block by the tire when the block is slid into its recess.

3. A resilient tire having parallel longitudinal openings extending therethrough and provided with an enlarged recess extending inward from one extremity of the tire, and communicating with said longitudinal openings and also closed on all sides except at the extremity of the tire, in combination with a coupling-block adapted to slide longitudinally into said recess, and a pair of securing strips or wires having their ends bent back at acute angles to form reversely-disposed hooks which are free to be inserted in and removed from oblique transverse openings in the coupling-block only when the latter is slid out of its recess, substantially as described.

In testimony whereof I affix my signature in presence of two witnesses.

THOMAS W. MORRIS.

Witnesses:
GEO. G. NEWTON,
W. W. WILDMAN.